US009213889B2

(12) United States Patent
Perkins et al.

(10) Patent No.: US 9,213,889 B2
(45) Date of Patent: Dec. 15, 2015

(54) ATHLETE SPEED PREDICTION METHOD USING DATA FROM ATTACHED INERTIAL MEASUREMENT UNIT

(71) Applicant: THE REGENTS OF THE UNIVERSITY OF MICHIGAN, Ann Arbor, MI (US)

(72) Inventors: Noel C. Perkins, Ann Arbor, MI (US); Ryan S. McGinnis, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/224,386

(22) Filed: Mar. 25, 2014

(65) Prior Publication Data

US 2014/0297008 A1    Oct. 2, 2014

Related U.S. Application Data

(60) Provisional application No. 61/805,996, filed on Mar. 28, 2013.

(51) Int. Cl.
*G01P 3/00* (2006.01)
*G06K 9/00* (2006.01)

(52) U.S. Cl.
CPC .................. *G06K 9/00342* (2013.01)

(58) Field of Classification Search
CPC ..... A63F 13/21; A63F 13/211; A63F 13/212; A63F 2300/105; G01P 3/00
USPC ............. 463/36, 37; 482/8; 345/158; 700/91; 73/488
See application file for complete search history.

(56) References Cited

U.S. PATENT DOCUMENTS

| | | | |
|---|---|---|---|
| 4,601,206 A | 7/1986 | Watson | |
| 4,759,219 A | 7/1988 | Cobb et al. | |
| 5,539,935 A | 7/1996 | Rush, III | |
| 5,548,999 A | 8/1996 | Kakizaki et al. | |
| 5,694,340 A | 12/1997 | Kim | |
| 6,073,086 A | 6/2000 | Marinelli | |
| 6,128,955 A | 10/2000 | Mimura | |
| 6,148,271 A | 11/2000 | Marinelli | |
| 6,151,563 A | 11/2000 | Marinelli | |
| 6,157,898 A | 12/2000 | Marinelli | |
| 6,195,261 B1 | 2/2001 | Babutzka et al. | |
| 6,301,964 B1 * | 10/2001 | Fyfe et al. ...................... | 73/510 |
| 6,725,719 B2 | 4/2004 | Cardarelli | |
| 6,836,744 B1 | 12/2004 | Asphahani et al. | |

(Continued)

FOREIGN PATENT DOCUMENTS

JP    2008038418 A    2/2008

OTHER PUBLICATIONS

Alaways, L. and Hubbard, M., "Experimental determination of baseball spin and lift," *Journal of Sports Sciences*, (May 2001), vol. 19, No. 5, pp. 349-358.

(Continued)

*Primary Examiner* — Allen Chan
(74) *Attorney, Agent, or Firm* — Harness, Dickey & Pierce, PLC (57) ABSTRACT

An apparatus and method for calculating athlete speed non-invasively, on the field/court of play using data from a torso-mounted inertial measurement unit. The method complements existing, GPS-based methods for calculating athlete speed by enabling use in environments where GPS signal is unavailable (i.e. indoors).

18 Claims, 5 Drawing Sheets

(56) References Cited

U.S. PATENT DOCUMENTS

| | | | |
|---|---|---|---|
| 7,021,140 B2 | 4/2006 | Perkins | |
| 7,234,351 B2 | 6/2007 | Perkins | |
| 7,237,446 B2 | 7/2007 | Chan et al. | |
| 7,457,724 B2 | 11/2008 | Vock et al. | |
| 7,509,835 B2 | 3/2009 | Beck | |
| 7,536,909 B2 | 5/2009 | Zhao et al. | |
| 7,628,074 B2 | 12/2009 | Vannucci et al. | |
| 7,814,791 B2 | 10/2010 | Andersson et al. | |
| 7,849,740 B2 | 12/2010 | Nichol | |
| 7,907,838 B2 | 3/2011 | Nasiri et al. | |
| 7,938,004 B1 | 5/2011 | Brunsch, Jr. et al. | |
| 8,001,839 B2 | 8/2011 | Sugihara et al. | |
| 8,042,391 B2 | 10/2011 | Ye | |
| 8,156,806 B1 | 4/2012 | Cardarelli | |
| 8,186,217 B2 | 5/2012 | Veltink | |
| 8,209,147 B2 | 6/2012 | Solinsky | |
| 8,250,921 B2 | 8/2012 | Nasiri et al. | |
| 8,616,989 B2 | 12/2013 | Bentley | |
| 8,668,595 B2 | 3/2014 | Boyd et al. | |
| 2002/0040601 A1* | 4/2002 | Fyfe et al. | 73/490 |
| 2002/0077189 A1 | 6/2002 | Tuer et al. | |
| 2003/0023192 A1 | 1/2003 | Foxlin | |
| 2003/0070483 A1 | 4/2003 | Mueller | |
| 2003/0149528 A1 | 8/2003 | Lin | |
| 2005/0081629 A1 | 4/2005 | Hoshal | |
| 2005/0143949 A1 | 6/2005 | Hagstedt | |
| 2006/0042382 A1 | 3/2006 | DCamp et al. | |
| 2006/0062382 A1 | 3/2006 | Ronkainen | |
| 2006/0161363 A1 | 7/2006 | Shibasaki et al. | |
| 2006/0185431 A1 | 8/2006 | Birecki et al. | |
| 2006/0185432 A1 | 8/2006 | Weinberg | |
| 2006/0230829 A1 | 10/2006 | Byrd | |
| 2006/0287085 A1* | 12/2006 | Mao et al. | 463/37 |
| 2007/0039387 A1 | 2/2007 | Jouanet et al. | |
| 2007/0169551 A1 | 7/2007 | Kelly | |
| 2008/0176681 A1 | 7/2008 | Donahoe | |
| 2008/0196499 A1 | 8/2008 | Li et al. | |
| 2008/0255795 A1 | 10/2008 | Shkolnikov | |
| 2008/0285805 A1* | 11/2008 | Luinge et al. | 382/107 |
| 2009/0048044 A1 | 2/2009 | Oleson et al. | |
| 2009/0255335 A1 | 10/2009 | Fly et al. | |
| 2009/0262074 A1 | 10/2009 | Nasiri et al. | |
| 2009/0325739 A1 | 12/2009 | Gold | |
| 2010/0030482 A1* | 2/2010 | Li | 702/19 |
| 2010/0053331 A1 | 3/2010 | Accurso | |
| 2010/0089155 A1 | 4/2010 | Sugihara et al. | |
| 2010/0184563 A1 | 7/2010 | Molyneux et al. | |
| 2010/0211317 A1* | 8/2010 | Kroepfl et al. | 701/220 |
| 2011/0077891 A1 | 3/2011 | Koenig | |
| 2011/0118065 A1 | 5/2011 | Krysiak et al. | |
| 2011/0215931 A1 | 9/2011 | Callsen et al. | |
| 2011/0313552 A1 | 12/2011 | Davenport | |
| 2012/0004882 A1 | 1/2012 | Sheynblat | |
| 2012/0078570 A1 | 3/2012 | Rothkopf et al. | |
| 2012/0271565 A1 | 10/2012 | Berme et al. | |
| 2012/0277015 A1 | 11/2012 | Boyd et al. | |
| 2012/0296601 A1 | 11/2012 | Eatwell | |
| 2013/0029791 A1 | 1/2013 | Rose et al. | |
| 2013/0068017 A1 | 3/2013 | Perkins et al. | |
| 2013/0073247 A1 | 3/2013 | Perkins et al. | |
| 2013/0073248 A1 | 3/2013 | Perkins et al. | |
| 2014/0045630 A1 | 2/2014 | Perkins et al. | |

OTHER PUBLICATIONS

Alaways, L., Mish, S. and Hubbard, M., "Identification of release conditions and aerodynamic forces in pitched-baseball trajectories," *Journal of Applied Biomechanics*, (Feb. 2001), vol. 17, No. 1, pp. 63-76.
Anderson, D., Perkins, N.C., and Richards, B., "Quantitative understanding of the fly casting stroke through measurements and robotic casting," (Jun. 2006), Sports Engineering, vol. 9, Issue 2, pp. 97-106.
Bahill, A.T., and Baldwin, D.G., "Describing baseball pitch movement with right-hand rules," *Computers in Biology and Medicine*, (Jul. 2007), vol. 37, No. 7, pp. 1001-1008.
Berkson, E., Aylward, R., Zachazewski, J., Paradiso, J., and Gill, T., "IMU Arrays: The Biomechanics of Baseball Pitching," The Orthopaedic Journal at Harvard Medical School, (Nov. 2006), vol. 8, pp. 90-94.
Cloete, T., and Scheffer, C., "Benchmarking of a full-body inertial motion capture system for clinical gait analysis," 30th Annual International IEEE EMBS Conference, Vancouver, British Columbia, Canada, (Aug. 20-24, 2008), pp. 4579-4582.
Costello, Mark et al., Determining Angular Velocity and Angular Acceleration of Projectiles Using Triaxial Acceleration Measurements, Journal of Spacecraft and Rockets, Jan.-Feb. 2002, vol. 39, No. 1: p. 73-80.
Dillman, C., Fleisig, G., and Andrews, J., "Biomechanics of Pitching with Emphasis upon Shoulder Kinematics," *Journal of Orthopaedic & Sports Physical Therapy*, (Aug. 1993), vol. 18, No. 2, pp. 402-408.
Feltner, M. and Dapena, J., "Dynamics of the Shoulder and Elbow Joints of the Throwing Arm During a Baseball Pitch," *International Journal of Sport Biomechanics*, (Nov. 1986), vol. 2, No. 4, pp. 235-259.
Fleisig, G. S., Bolt, B., Fortenbaugh, D., Wilk, K. E., and Andrews, J. R., "Biomechanical Comparison of Baseball Pitching and Long-Toss: Implications for Training and Rehabilitation," *Journal of Orthopaedic & Sports Physical Therapy*, (May 2011), vol. 41, No. 5, pp. 296-303.
Fleisig, G., Barrentine, S., Zheng, N., Escamilla, R., and Andrews, J., "Kinematic and kinetic comparison of baseball pitching among various levels of development," *Journal of Biomechanics*, (Dec. 1999), vol. 32, No. 12, pp. 1371-1375.
International Search Report, International Application No. PCT/US2014/032020, dated Aug. 21, 2014, 5 pages.
Jinji, T. and Sakuri, S., "Throwing arm motion to determine spin axis of pitched baseball," presented at the XXIV ISBS Symposium, Salzburg, Austria, 2006.
King, K. W., "The design and application of wireless MEMS inertial measurement units for the measurement and analysis of golf swings," University of Michigan, Ann Arbor, MI, (2008), 150 pages.
King, K., Yoon, S. W., Perkins, N. C., and Najafi, K., "Wireless MEMS inertial sensor system for golf swing dynamics," *Sensors and Actuators A: Physical*, (Feb. 15, 2008), vol. 141, No. 2, pp. 619-630.
King, K.W., and Perkins, N. C., "Putting Stroke Analysis Using Wireless MEMS Inertial Sensor System," (2008), World Scientific Congress on Golf V, Phoenix, AZ, pp. 270-278.
Koda, H., Sagawa, K., Kuroshima, K., Tsukamoto, T., Urita, K., and Ishibashi, Y., "3D Measurement of Forearm and Upper Arm during Throwing Motion Using Body Mounted Sensor," *Journal of Advanced Mechanical Design Systems and Manufacturing*, (2010), vol. 4, No. 1, pp. 167-178.
Krishnan, V., Measurement of Angular Velocity and Linear Acceleration Using Linear Accelerometers, Journal of the Franklin Institute, vol. 280, No. 4, Oct. 1965, pp. 307-315.
Lapinski, M., Berkson, E., Gill, T., Reinold, M., and Paradiso, J. A., "A Distributed Wearable, Wireless Sensor System for Evaluating Professional Baseball Pitchers and Batters," *2009 International Symposium on Wearable Computers, Proceedings*, Los Alamitos: IEEE Computer Soc., (2009), pp. 131-138.
Mayagoitia, R., Nene, A., Veltink, P., "Accelerometer and rate gyroscope measurement of kinematics: an inexpensive alternative to optical motion analysis systems," (2002), Journal of Biomechanics, vol. 35, pp. 537-542.
Nathan, A. M., "The effect of spin on the flight of a baseball," *American Journal of Physics*, (Feb. 2008), vol. 76, No. 2, pp. 119-124.
Perkins, N., and Richards, B., "Understanding Your Casting Stroke," Fly Fisherman, (Dec. 2003), pp. 34-37 and 66.
Randolph, J., "Casting in the Groove," Fly Fisherman, (Dec. 2003), p. 6.
Roetenberg, D., Luinge, H., and Slycke, P., "Xsens MVN: Full 6DOF Human Motion Tracking Using Miniature Inertial Sensors," XSENS Technologies, (Apr. 2009), pp. 1-7.
Sakuri, S., Ikegami, Y., Okamoto, A., Yabe, K., and Toyoshima, S., "A three-dimensional cinematographic analysis of upper limb move- (56) References Cited

OTHER PUBLICATIONS ment during fastball and curveball baseball pitches," *Journal of Applied Biomechanics*, (1993), vol. 9, pp. 47-65.

Search Report and Written Opinion for PCT/US2013/053556, mailed Dec. 17, 2013.

Simo, J. C., Tarnow, N., and Doblare, M. "Non-linear dynamics of three-dimensional rods: Exact energy and momentum conserving algorithms," *International Journal for Numerical Methods in Engineering*, (May 1995), vol. 38, No. 9, pp. 1431-1473.

Theobalt, C., Albrecht, I., Haber, J., Magnor, M., and Seidel, H.P., "Pitching a baseball: tracking high-speed motion with multi-exposure images," *ACM Trans. Graph.*, (Aug. 2004), vol. 23, No. 3, pp. 540-547.

Zhou, H., Stone, T., Hu, H. and Harris, N., "Use of multiple wearable inertial sensors in upper limb motion tracking," (2008), Medical Engineering & Physics, vol. 30, pp. 123-133.

Bisseling, R. et al., "Handling of Impact Forces in Inverse Dynamics", Journal of Biomechanics, vol. 39, Issue 13, 2006, pp. 2438-2444.

Qin, Z., Baron, L., Birglen, L., Robust Design of Inertial Measurement Units Based on Accelerometers, *J. Dyn. Sys., Meas., Control* 131(3), 031010 (Mar. 20, 2009) (10 pages) doi: 10.1115/1.3072157.

* cited by examiner

ATHLETE SPEED PREDICTION METHOD USING DATA FROM ATTACHED INERTIAL MEASUREMENT UNIT

CROSS-REFERENCE TO RELATED APPLICATIONS

This application claims the benefit of U.S. Provisional Application No. 61/805,996, filed on Mar. 28, 2013. The entire disclosure of the above application is incorporated herein by reference.

FIELD

The present disclosure relates to sports training and, more particularly, relates to a method for calculating athlete speed non-invasively, on the field/court of play, using data from a torso-mounted inertial measurement unit.

BACKGROUND AND SUMMARY

This section provides background information related to the present disclosure which is not necessarily prior art. This section provides a general summary of the disclosure, and is not a comprehensive disclosure of its full scope or all of its features.

The present apparatus and method complement existing, GPS-based methods for calculating athlete speed by enabling use in environments where GPS signal is unavailable (i.e. indoors). The resulting speed information supports application in athlete monitoring, training, and assessment during game and practice settings.

With the near ubiquity of MEMS inertial measurement unit (IMU) and GPS technologies, there is a growing interest in their application to athlete monitoring and assessment. Several products have recently come to market which exploit these technologies to identify performance metrics (e.g. speed, acceleration, load, etc.) useful for coaches. Two of these products in particular are incorporated into clothing, holding them tightly against the athlete's torso so as to be unobtrusive and removed from parts of the body used in most sports (i.e. hands and feet). These products specifically target outdoor sports, like soccer, rugby, and Australian football, where a fusion of IMU and GPS data can be used to estimate athlete speed. However, for indoor sports like basketball, these sensors-fusion methods cannot be used. Existing GPS-free techniques require subject-specific calibration, a non-torso mounting location, or an array of IMUs to provide accurate speed estimates.

The present disclosure provides a new method for calculating the horizontal speed of an athlete using a single, torso-mounted IMU which does not require subject specific calibration or the use of GPS data. The results from this method are compared to speed determined from video based motion capture (MOCAP). Below we describe the IMU technology used to demonstrate the success of the present method. Following this, we describe our novel algorithm for accurately estimating athlete speed. Next, we present results of a benchmarking study which demonstrate the accuracy of the present method. We then summarize the current state of the art for estimating athlete speed and possible additions/modifications that could be made to our method.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, an apparatus and method are disclosed that employ an IMU to obtain kinematic data. During a benchmarking experiment, an IMU (Yost Engineering, YEI 3-space, 35 mm×60 mm×15 mm, 28 grams, FIG. 1A) is used to provide three-axis sensing of angular velocity and linear acceleration. (Many other IMU designs could also be used for this purpose and will yield similar results.) This example device measures angular rates up to 2000 deg/s, with 16-bit resolution, and a 0.03 deg/sec/√Hz noise floor and accelerations up to 12 g, with 14-bit resolution, and a 650 µg/√Hz noise floor. Data is stored in flash memory on the device and is downloaded to a computer upon completion of all trials via USB. These commercial IMUs are intended to provide highly accurate orientation information and as such provide well calibrated angular velocity data. Environmental factors are taken into account by identifying the offset values for the gyro at the start of each trial. The accelerometer data is calibrated following a common static calibration technique which yields scale factor and offset values for each of the three sense axes. The combination of calibration techniques ensures that the IMU provides accurate measurement of acceleration and angular velocity resolved along orthogonal unit vectors ($\hat{e}_1$, $\hat{e}_2$, $\hat{e}_3$) shown in FIG. 1A. The IMU data is low-pass filtered (for example with a cut-off frequency of 15 Hz.) prior to use. The three components of calibrated acceleration data for an example trial from the benchmark experiment are shown in FIG. 1B.

Figure 1A:
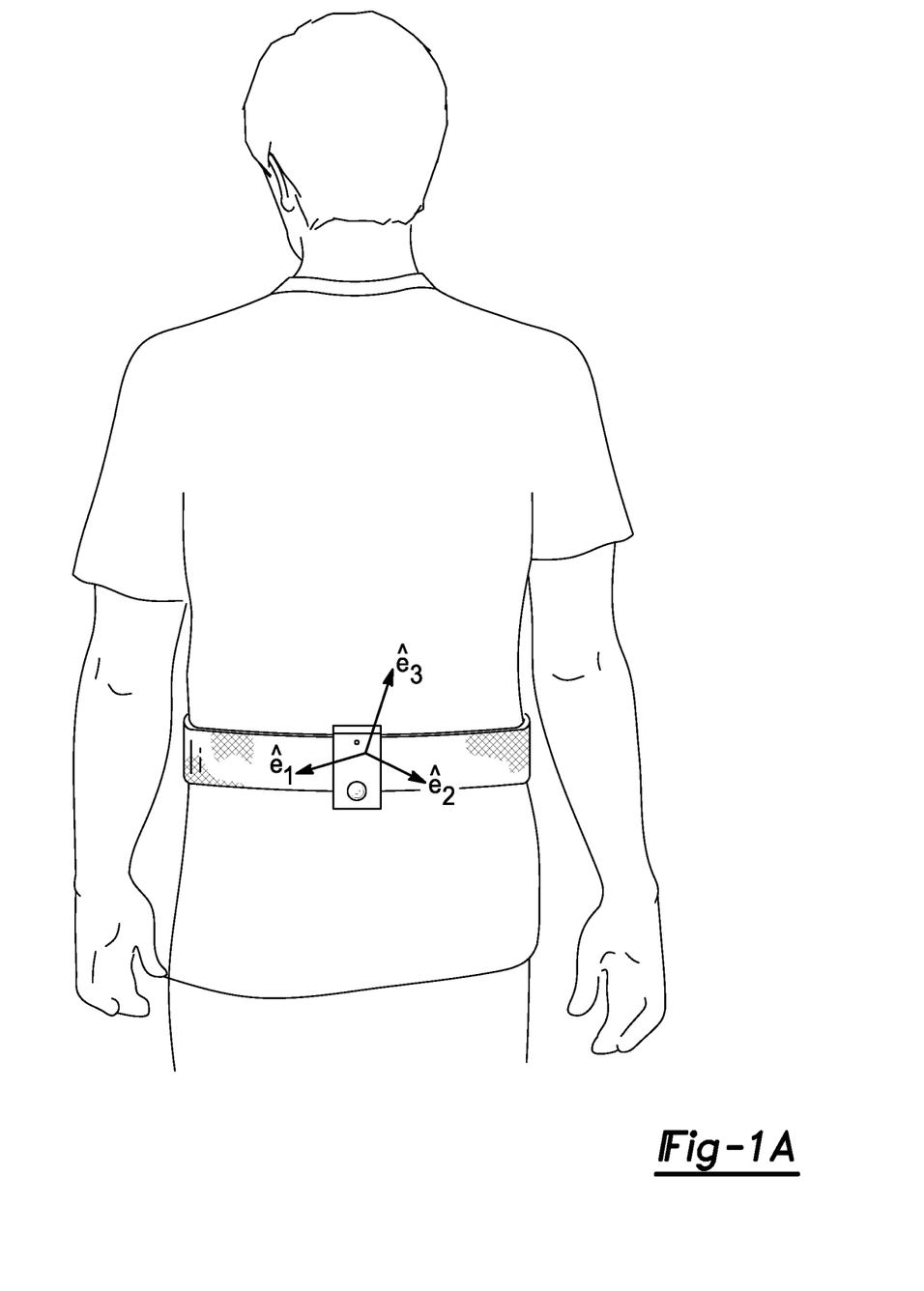
FIG. 1A illustrates a user having a 3-space inertial measurement unit (IMU) mounted to a lumbar portion of the user's spine.
Figure 1B:
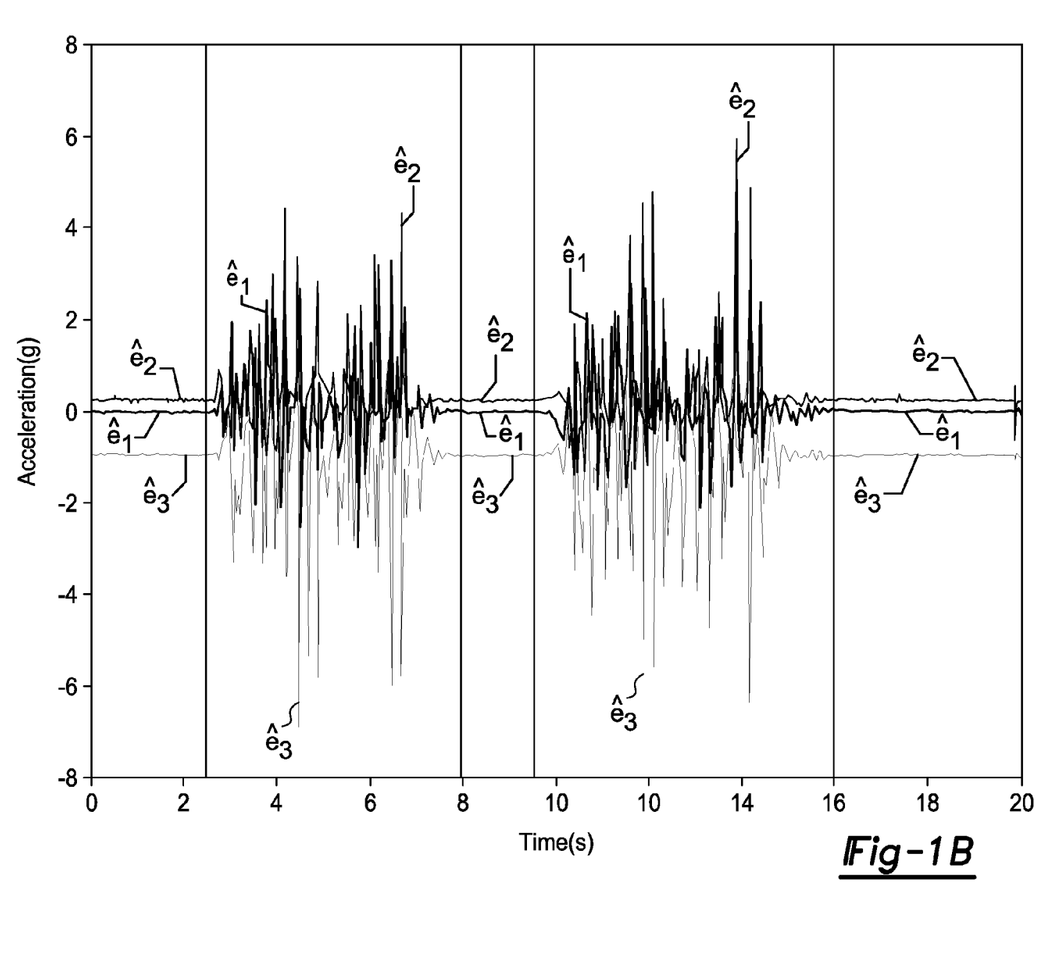
FIG. 1B is a graph illustrating acceleration (g) relative to time during two periods of motion with stationary periods therebetween.

As illustrated in FIG. 1A, the IMU is held in place using an elastic strap which wraps around the lower abdomen of the athlete, indexing the device against the lumbar portion of spine. The IMU may also be mounted elsewhere on the torso. The acceleration components, shown in FIG. 1B, illustrate two specific motion periods (each denoted by a rectangular box). These can be identified by considering instances when the vector magnitude of the IMU measured acceleration and angular velocity depart from their stationary values by more than a threshold defined by the noise magnitude in the measured data while the subject is at rest at the start of the trial (e.g. 3.4 deg/s, 0.08 g for the example IMU). The acceleration data outside of these motion periods illustrates the fact that the IMU measures the acceleration of the center of the accelerometer polluted by gravity. Specifically, the relationship between the athlete-induced acceleration at the center of the accelerometer $\vec{a}$, and the acceleration measured by the IMU $\vec{a}_m$, is defined as:

$$\vec{a} = \vec{a}_m - \vec{g} \tag{1}$$

where $\vec{g}$ is the acceleration due to gravity (i.e. 9.81 m/s²). To recover the acceleration induced by athlete motion, we define the orientation of the IMU relative to an inertial frame (frame I) defined by the orthogonal triad of unit vectors ($\hat{E}_1^I$, $\hat{E}_2^I$, $\hat{E}_3^I$), where $\hat{E}_1^I$ and $\hat{E}_2^I$ define the horizontal plane, and $\hat{E}_3^I$ is aligned with gravity.

The orientation of the IMU relative to frame I is determined in two steps. The first step establishes the initial orientation of the IMU sense axes while the athlete is at rest at the start of the trial. During this time the accelerometers measure solely the acceleration due to gravity thus establishing the initial direction of $\hat{E}_3^I$ in the IMU reference frame. Next, the direction of $\hat{E}_2^I$ in the IMU reference frame is determined according to $\hat{E}_2^I = \hat{E}_3^I \times \hat{e}_1$. Finally, the direction of $\hat{E}_1^I$ in the IMU reference frame follows from $\hat{E}_1^I = \hat{E}_2^I \times \hat{E}_3^I$. The initial direction cosine matrix that defines the orientation of the IMU frame, ($\hat{e}_1$, $\hat{e}_2$, $\hat{e}_3$), relative to the inertial frame ($\hat{E}_1^I$, $\hat{E}_2^I$, $\hat{E}_3^I$) follows immediately from the components of $\hat{E}_1^I$, $\hat{E}_2^I$ and $\hat{E}_3^I$ established by this procedure. The components of the direction cosine matrix also establish the initial values of the Euler parameters per:

$$R(t) = \begin{bmatrix} e1^2 - e2^2 - e3^2 + e4^2 & 2(e1e2 - e3e4) & 2(e1e3 + e2e4) \\ 2(e1e2 + e3e4) & e2^2 - e1^2 - e3^2 + e4^2 & 2(e2e3 + e1e4) \\ 2(e1e3 + e2e4) & 2(e2e3 + e1e4) & e3^2 - e1^2 - e2^2 + e4^2 \end{bmatrix} \tag{2}$$

for the subsequent use in the second step.

During the second step, the evolution of the Euler parameters from the initial condition above is governed by the differential equation $$\dot{\vec{e}} = \vec{e} \begin{bmatrix} 0 & -\omega_3 & \omega_2 & -\omega_1 \\ \omega_3 & 0 & -\omega_1 & -\omega_2 \\ -\omega_2 & \omega_1 & 0 & -\omega_3 \\ \omega_1 & \omega_2 & \omega_3 & 0 \end{bmatrix} \quad (3)$$

where $\vec{e}$ is a vector of Euler parameters ($\vec{e}=[e1\ e2\ e3\ e4]$), and $\omega_1$, $\omega_2$, and $\omega_3$ are the three components of the measured angular velocity in the IMU frame. This ordinary differential equation in time is solved using standard numerical integration techniques while renormalizing the vector of Euler parameters at each time step.

From the Euler parameters at every instant in time, the direction cosine matrix R(t), from Eq. (2), defines a rotation, from the IMU measurement frame to the I frame according to:

$$\vec{x}|_I = R(t)\vec{x}|_{IMU} \quad (4)$$

where $\vec{x}|_I$ is a generic vector resolved in the I frame and $\vec{x}|_{IMU}$ is the same generic vector resolved in the IMU measurement frame. Completion of the two steps for determining IMU orientation allows the solution of Eq. (1) for the acceleration of the athlete $\vec{a}$, and subsequent integration of $\vec{a}$ (e.g., numerically via the trapezoidal rule) during each of the motion periods yields the athlete's velocity subject to the initial condition that the athlete is at rest at the beginning of the motion period.

New Method for Estimating Athlete Speed

It is well established that integration of IMU-measured acceleration introduces significant error in the velocity due to drift. The heart of this new method for estimating athlete speed focuses on approximately identifying and removing this drift error per:

$$\vec{v}_c = \vec{v} - \vec{f}(t) \quad (5)$$

where $\vec{v}$ is the uncorrected athlete velocity as determined according to the method described above, $\vec{v}_c$ is the drift-corrected velocity of the athlete, and $\vec{f}(t)$ is a vector function in time which approximates the drift error. The function $\vec{f}(t)$ is identified by considering instances when the motion of the athlete is known. For example, the athlete is stationary at the start ($t_s$) and end ($t_e$) of the motion period yielding:

$$\vec{f}(t_j) = \vec{v}(t_j) \text{ for } j = s \text{ and } e \quad (6)$$

Occasionally, there are instances during the motion period ($t_s < t < t_e$) where the measured acceleration and angular velocity approximately return to their stationary values suggesting the athlete's velocity is approximately zero. For q of these "zero velocity updates," we have similarly:

$$\vec{f}(t_j) \cong \vec{v}(t_j) \text{ for } j = 1, \ldots, q \quad (7)$$

where $t_j$ is the time of the $j^{th}$ zero velocity update. Moreover, since we consider the motion of a human athlete, we assume that the jerk (time derivative of acceleration) at the start and end of the trial is approximately zero yielding:

$$\dot{\vec{f}}(t_j) \cong \dot{\vec{v}}(t_j) \text{ for } j = s \text{ and } e \quad (8)$$

where $\dot{\vec{f}}(t_j)$ is the time derivative of the drift-error function, and $\dot{\vec{v}}(t_j)$ is the time derivative of the uncorrected velocity at the start or end of the motion period. For cases when there are less than two zero velocity updates ($q \le 1$), we define the drift-error function as:

$$\vec{f}(t) = \vec{c}_0 + \vec{c}_1 t + \vec{c}_2 t^2 \quad (9)$$

where the three coefficients of the polynomial ($\vec{c}_0$, $\vec{c}_1$, $\vec{c}_2$) are defined such that Eq. (6) is satisfied exactly and the squared error in Eqs. (7) and (8) is minimized (where appropriate). This is accomplished herein according to the method of Lagrange multipliers but any constrained optimization technique can be used. For cases where there are two or more zero velocity updates ($q > 1$) during a single motion period, the drift error is approximated as a piecewise-linear function in time per:

$$\vec{f}(t) = \begin{cases} \vec{c}_{1,0} + \vec{c}_{1,1}t & t_s \ge t \ge t_1 \\ \vec{c}_{j,0} + \vec{c}_{j,1}t & t_{j-1} > t \ge t_j \\ \vec{c}_{q,1,0} + \vec{c}_{q+1,1}t & t_q > t \ge t_e \end{cases} \quad (10)$$

$$\text{for } j = 2, \ldots, q$$

where q+1 linear segments are defined resulting in 2(q+1) unknown coefficients. The drift-error function is assumed continuous in time which yields q equations, one for each zero velocity update per:

$$\vec{c}_{j,0} + \vec{c}_{j,1}t_j = \vec{c}_{j+1,0} + \vec{c}_{j+1,1}t_j \text{ for } j = 1, \ldots, q \quad (11)$$

Finally, the accelerations of consecutive segments of the drift-error function are assumed to be approximately equal according to:

$$\vec{c}_{j,1} \cong \vec{c}_{j+1,1} \text{ for } j = 1, \ldots, q \quad (12)$$

for each zero velocity update. This last equation serves to prevent the addition of substantial jerk to the corrected velocity due to a step change in acceleration at the zero velocity updates. Minimized jerk is characteristic of smooth human motion. The unknown coefficients of the piecewise-linear approximation of drift-error are defined such that Eqs. (6) and (11) are satisfied exactly, and the squared error in Eqs. (7), (8), and (12) is minimized. As with the $q \le 1$ case, this is accomplished using the method of Lagrange multipliers. Provided an approximation of the drift-error, (5) is solved for the corrected athlete velocity resolved in frame I. The horizontal speed of the athlete is then defined as the vector sum of the two horizontal components of the corrected velocity ($\hat{E}_1^I$ and $\hat{E}_2^I$).

Figure 2A:
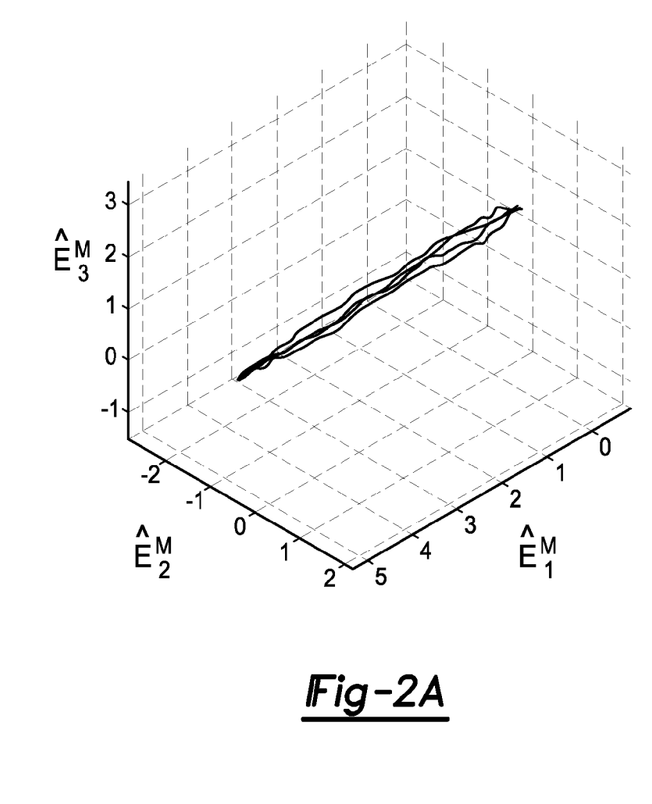
FIG. 2A illustrates a MOCAP marker trajectory during straight-line walking, jogging, and running trials.
Figure 2B:
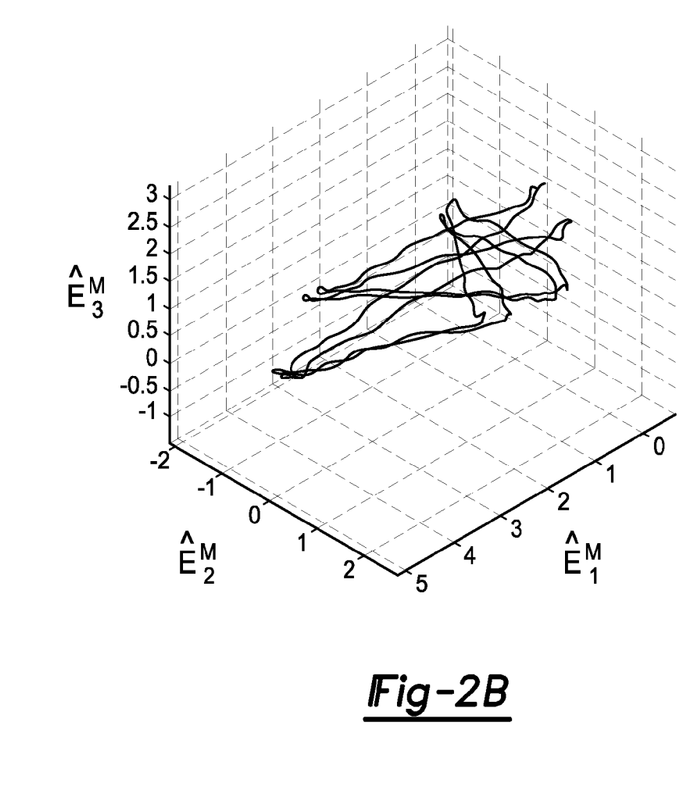
FIG. 2B illustrates a MOCAP marker trajectory during random running trials.

Evidence Supporting the Accuracy of the Method and Comparison to Existing Techniques Benchmarking is achieved by comparing IMU- and MOCAP-based speed predictions for 40 trials of a single subject. The data set is composed of 10 trials each of straight-line walking, jogging, and running and 10 trials of running a more complicated, predefined zig-zag course. For each trial, the subject begins at rest, completes a specified course, stands still momentarily, repeats the course again, and finishes the trial at rest. During the straight-line walking ("Walk"), jogging ("Jog"), and running ("Run") trials, the course is defined as a straight path between two cones, 5 m apart (FIG. 2A). For the 10 remaining running trials ("Random"), the course is defined as a path between 6 cones placed to span the space of the MOCAP capture volume (FIG. 2B). The marker trajectory for an example trial from each type of motion is shown in FIG. 2.

Simultaneous to the collection of IMU data, a 16-camera Vicon™ MOCAP system is used to record the three-dimensional position of a reflective marker attached to the IMU (FIG. 1A) during each trial at 240 Hz. This position data is resolved in the measurement frame of the motion capture system which, thanks to careful calibration, is defined by the orthogonal unit vectors ($\hat{E}_1^M, \hat{E}_2^M, \hat{E}_3^M$) where $\hat{E}_1^M$ and $\hat{E}_2^M$ define the horizontal plane, but are not necessarily aligned with $\hat{E}_1^I$ and $\hat{E}_2^I$, and $\hat{E}_3^M$ points vertically upwards. The MOCAP position data is low-pass filtered at 15 Hz., and then numerically differentiated to determine the three components of marker velocity. The vector sum of the velocity components resolved along the two horizontal directions ($\hat{E}_1^M$ and $\hat{E}_2^M$) gives the horizontal speed of the athlete. We present results from the novel drift correction algorithm next.

Figure 3:
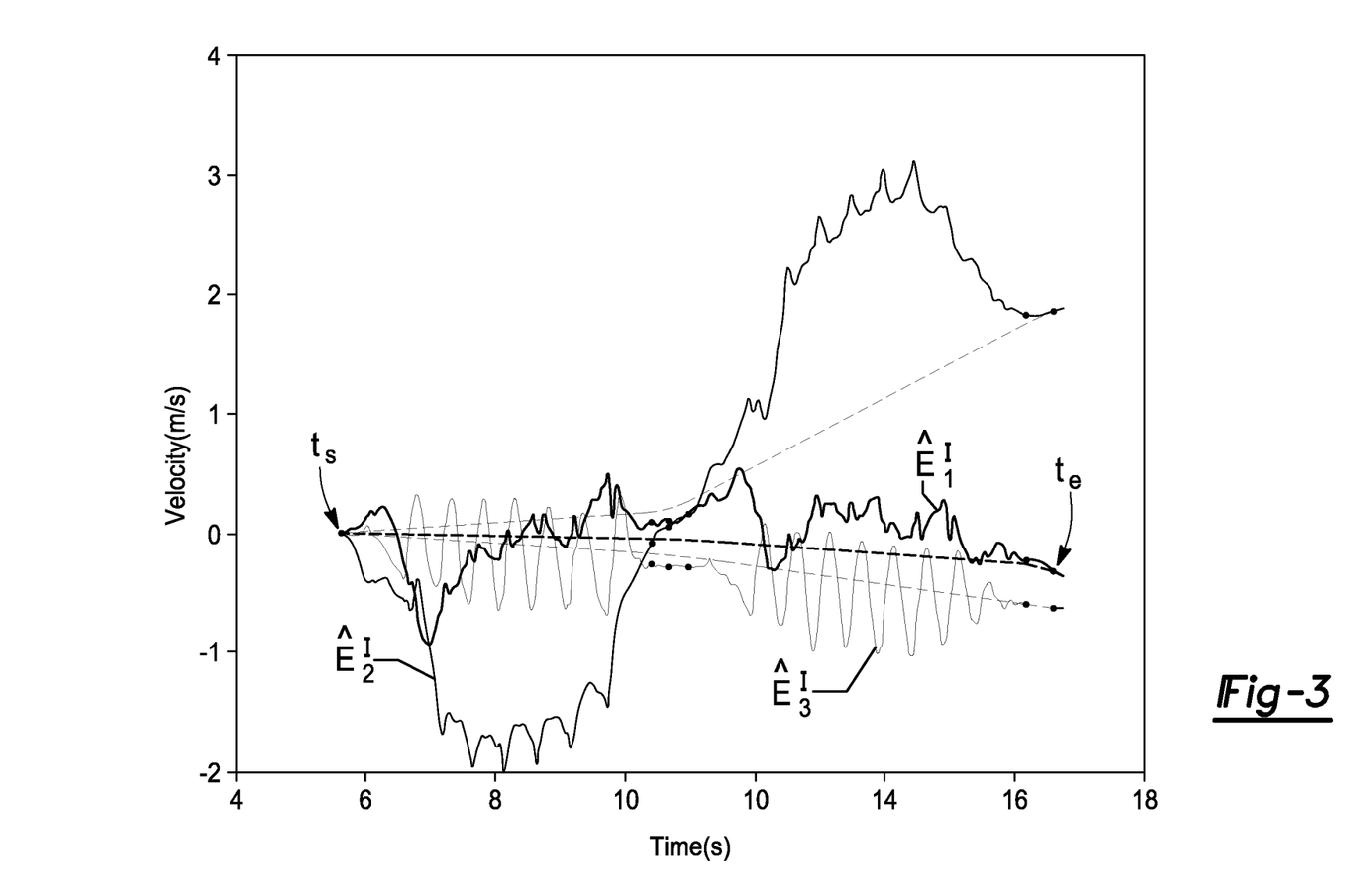
FIG. 3 illustrates uncorrected velocity components ($\hat{E}_1^I$, $\hat{E}_2^I$, $\hat{E}_3^I$) as determined from IMU data (solid curves) with their respective drift correction functions (dashed curves) for an example "Walk" trial where q>1. Instances where the athlete might be at rest are indicated as dots on each of the curves. The start and end points of the motion period are identified as $t_s$ and $t_e$ respectively.

FIG. 3 illustrates three components of uncorrected athlete velocity (solid curves, $\hat{E}_1^I$=blue, $\hat{E}_2^I$=green, $\hat{E}_3^I$=red) plotted against time for an example "Walk" trial as well as the piecewise-linear drift corrections (dashed curves, $\hat{E}_1^I$=blue, $\hat{E}_2^I$=green, $\hat{E}_3^I$=red). The solid curves illustrate the need for a correction to account for drift in velocity when determined via integration of $\vec{a}$ as evidenced by the fact that each velocity component should equal zero at the end of the motion period ($t_e$). The approximation of the drift error forces the velocity at $t_e$ to zero while minimizing the velocity and added jerk at the zero velocity updates (see time interval from 10-12 s in FIG. 3). Once the velocity components are corrected according to Eq. (5), they can be used to calculate the instantaneous horizontal speed of the athlete as shown compared to MOCAP in FIG. 4.

Figure 4A:
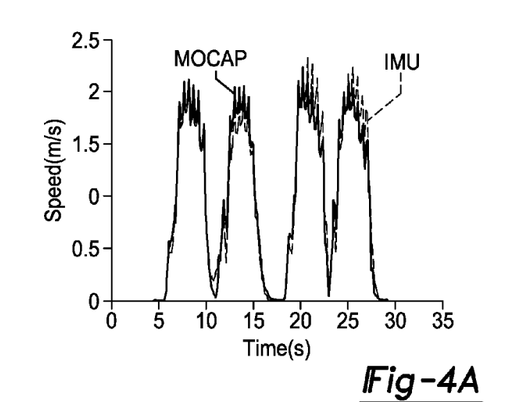
FIG. 4A is a graph illustrating speed (m/s) relative to time comparing the IMU and MOCAP predicted horizontal speeds.
Figure 4B:
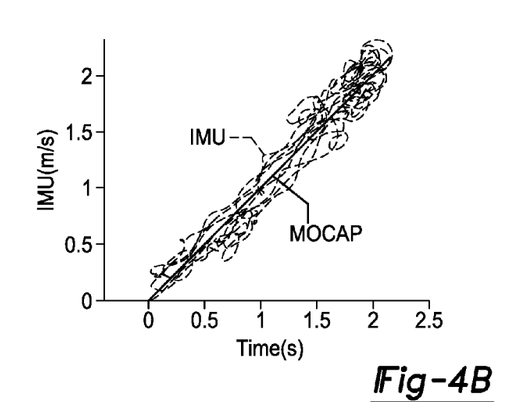
FIG. 4B is a graph illustrating a correlation plot of IMU versus MOCAP having a best fit line to the data and a line with unit slope.

The IMU (blue) and MOCAP (red) predicted speed of the athlete are shown plotted against time for the same example "Walk" trial (FIG. 3) in FIG. 4A. The agreement in speed remains excellent during the trial. Quantitatively, the RMS error in the IMU-predicted speed (as compared to MOCAP) is 0.14 m/s. To examine the relationship between IMU-estimated and MOCAP-calculated athlete speed further, we present the correlation plot shown in FIG. 4B. This figure plots IMU speed against MOCAP speed, where the individual data points are shown along with the best fit line, and a line with zero intercept and unit slope. As illustrated in FIG. 4B, the relationship between IMU and MOCAP estimated speed during this trial is well correlated (r=0.98) and has nearly unit slope (Slope=1.01). The mean (standard deviation) of the RMS error (RMSE), correlation (r), and slope of IMU-predicted speed compared to MOCAP for all 40 trials for all four motion types are reported in Table 1.

TABLE 1

Mean (standard deviation) of RMS error (RMSE), correlation coefficient (r), and slope of IMU-predicted speed compared to MOCAP for 10 trials of each of the four motion types (40 trials total).

| Motion Type | RMSE (m/s) | r | Slope |
| --- | --- | --- | --- |
| Walk | 0.35 (0.22) | 0.89 (0.11) | 0.98 (0.07) |
| Jog | 0.35 (0.16) | 0.96 (0.05) | 1.01 (0.06) |
| Run | 0.38 (0.16) | 0.97 (0.02) | 0.99 (0.04) |
| Random | 0.79 (0.44) | 0.85 (0.13) | 0.90 (0.09) |

The results presented in Table 1 confirm that the agreement between IMU predicted horizontal speed and that predicted from MOCAP is excellent for the "Run" and "Jog" motion types which have mean (SD) RMS errors of 0.38 (0.16) and 0.35 (0.16) m/s, correlation coefficients of 0.97 (0.02) and 0.96 (0.05), and slopes of 0.99 (0.04) and 1.01 (0.06), respectively. However, the "Walk" trials do not agree quite as well with MOCAP as evidenced by their slightly lower mean correlation coefficient (0.89), and the agreement is also less for the "Random" trials which exhibit larger RMSE (0.79 m/s), lower correlation coefficient (0.85), and a slope further from 1.0 (0.90). This discrepancy between IMU and MOCAP speed based on motion type exposes one of the main limitations of this technique; its sensitivity to increases in integration time ($t_e - t_s$). The Run, Jog, Walk, and Random motion patterns have mean (SD) integration times over the ten trials of 5.8 (0.4), 7.3 (1.0), 10.3 (0.5), and 12.8 (0.8) seconds, respectively. This suggests degradation in the accuracy of the IMU speed predictions with increasing integration time as evidenced in FIG. 5.

Figure 5A:
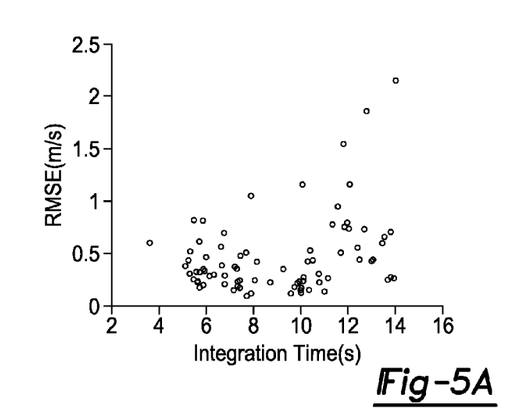
FIG. 5A is a graph illustrating RMS error relative to integration time between IMU and MOCAP predicted speed.
Figure 5B:
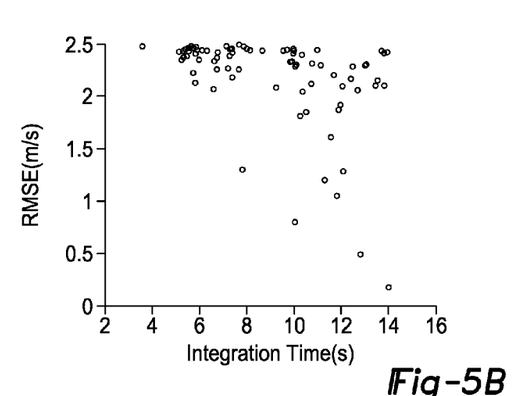
FIG. 5B is a graph illustrating correlation coefficient r relative to integration time between IMU and MOCAP predicted speed.

FIG. 5 provides a qualitative demonstration of the sensitivity of this method to increases in integration time. Specifically, as integration time increases, the RMS error relative to MOCAP increases (FIG. 5A), the correlation coefficient decreases (FIG. 5B), and the variability in each increases (FIGS. 5A and B). Luckily, athlete motion during sports, especially explosive sports like basketball, is often limited to short periods of running or sprinting (less than or equal to 10 s) separated by periods where the athlete is nearly stationary. Recognizing this, we present the mean (standard deviation) of the error metrics in Table 2 for integration times less than or equal to 10 seconds versus greater than 10 seconds.

TABLE 2

Mean (standard deviation) of RMS error (RMSE), correlation coefficient (r), and slope of IMU-predicted compared to MOCAP-predicted instantaneous horizontal speed for all 40 trials separated into two groups by integration time: integration times ≤10 s (first column) and >10 s (second column).

| Error Metric | $t_e - t_s \leq 10$ s | $t_e - t_s > 10$ s |
| --- | --- | --- |
| RMSE (m/s) | 0.35 (0.20) | 0.62 (0.48) |
| r | 0.96 (0.05) | 0.85 (0.16) |
| Slope | 0.99 (0.07) | 0.89 (0.14) |

Table 2 provides a summary of the agreement between IMU predictions of instantaneous speed and MOCAP for motions characteristic of explosive sports like basketball. The mean (SD) RMS error in the predicted speed is 0.35 (0.20) m/s for all motion periods less than or equal to 10 seconds. The instantaneous predictions of speed are well correlated with MOCAP yielding a mean (SD) correlation coefficient of 0.96 (0.05), and slope of 0.99 (0.07). This level of accuracy can be expected when this method is used to quantify athlete speed in highly dynamic sports, like basketball, soccer and football, where athletes quickly alternate between periods when they are standing nearly still and sprinting.

To compare these results to existing methods for estimating athlete speed using inertial sensor data, we must also quantify the error in the predicted average speed. If we consider motion periods with integration times≤10 s, the absolute mean (SD) error is 0.03 (0.18) m/s, and the RMS error is 0.18 m/s, or 4.3% relative to average MOCAP speed. These results compare favorably to those presented in past works, where a shank mounted IMU is used to predict average speed with absolute mean (SD) error of 0.11 (0.03) m/s, and RMSE of 5.9% relative to treadmill speed. They also compare favorably to the results presented in other works where neural-network based techniques are able to identify average speed to within 0.12 m/s RMS as compared to that determined by considering the stop-watch defined time to complete a course of fixed distance (also utilizing a heel-mounted IMU), or 0.15 m/s RMS as compared to treadmill speed. However, all of these other techniques also require subject specific calibrations, one requires multiple IMUs, and the other requires an IMU to be mounted on the shank of the athlete which may promote injury to the athlete or damage to the IMU.

Possible Modifications

There are several possible extensions/modifications to this method. One is to combine this technique with other methods for estimating athlete speed to increase the acceptable motion time for sports other than basketball, where motions are of longer duration. The second possible modification is to accommodate other IMU mounting locations on the torso (i.e. at the nape of the neck, indexed against the abdomen of the athlete, or any other location, etc.). One could also use the velocity estimated at one location (say the nape of the neck) to estimate that at another location (say the mass center of the torso) by exploiting the kinematic constraints of (assumed) rigid body dynamics.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for non-invasively obtaining velocity information of a subject, said method comprising:
   attaching an inertial measurement unit to the subject, said inertial measurement unit providing three-axis sensing of angular velocity and linear acceleration of the subject and outputting angular velocity and linear acceleration data;
   obtaining said angular velocity and linear acceleration data associated with said angular velocity and linear acceleration of the subject from said inertial measurement unit at a first time, the subject being stationary at said first time;
   calculating a drift error of a velocity of the subject as a function of time in response to said angular velocity and linear acceleration data at said first time;
   obtaining angular velocity and linear acceleration data associated with said angular velocity and linear acceleration of the subject from said inertial measurement unit at a second time, the subject being non-stationary at said second time;
   calculating a corrected velocity of the subject at said second time in response to said drift error and said angular velocity and linear acceleration data at said second time; and
   outputting said corrected velocity,
   wherein said calculating a corrected velocity of the subject at said second time in response to said drift error comprises calculating a corrected velocity according to the following equation:

$$\vec{v}_c = \vec{v} - \vec{f}(t)$$

where $\vec{v}$ is an uncorrected subject velocity calculated from said measured angular velocity and linear acceleration, $\vec{v}_c$ is said corrected velocity of the subject, and $\vec{f}(t)$ is a vector function in time of said drift error.

2. The method according to claim 1 wherein said determining said drift error of said velocity of the subject comprises determining a vector function in time of said velocity of the subject.

3. The method according to claim 1 wherein said angular velocity is substantially due to noise and said linear acceleration at said first time is substantially due to gravity and noise.

4. The method according to claim 1 where said first time is prior to the start of motion of the subject.

5. The method according to claim 1 wherein said first time is after completion of motion of the subject.

6. The method according to claim 1 wherein said attaching said inertial measurement unit to the subject comprises attaching an inertial measurement unit to a torso of the subject.

7. The method according to claim 1 wherein said attaching said inertial measurement unit to the subject comprises attaching an inertial measurement unit to a neck of the subject.

8. The method according to claim 1 wherein said attaching said inertial measurement unit to the subject comprises attaching an inertial measurement unit to a mass center of the subject.

9. The method according to claim 1 wherein said calculating said corrected velocity of the subject at said second time in response to said drift error and outputting said corrected velocity comprises calculating said corrected velocity of the subject at said second time at a first location on the subject in response to said drift error and outputting said corrected velocity of said first location and further calculating a corrected velocity of a second location on the subject in response to said corrected velocity of said first location and predetermined kinematic constraints.

10. A method for non-invasively obtaining velocity information of a subject, said method comprising:
    attaching an inertial measurement unit to the subject, said inertial measurement unit providing three-axis sensing of angular velocity and linear acceleration of the subject and outputting angular velocity and linear acceleration data;
    obtaining said angular velocity and linear acceleration data associated with said angular velocity and linear acceleration of the subject from said inertial measurement unit at a first time, the subject being stationary at said first time;
    calculating a drift error of a velocity of the subject as a function of time in response to said angular velocity and linear acceleration data at said first time;
    obtaining angular velocity and linear acceleration data associated with said angular velocity and linear acceleration of the subject from said inertial measurement unit at a second time, the subject being non-stationary at said second time;
    calculating a corrected velocity of the subject at said second time in response to said drift error and said angular velocity and linear acceleration data at said second time;
    outputting said corrected velocity;
    obtaining said angular velocity and linear acceleration data associated with said angular velocity and linear acceleration of the subject from said inertial measurement unit at a third time, the subject being stationary at said third time,
    wherein said calculating said drift error of said velocity of the subject as a function of time is in response to said angular velocity and linear acceleration data at said first time and said third time.

11. The method according to claim 10 wherein said drift error determined in response to said first time and said drift error determined in response to said third time are consecutive and approximately equal to each other.

12. A method for non-invasively obtaining velocity information of a subject, said method comprising:
- attaching no more than one inertial measurement unit to the subject, said inertial measurement unit providing three-axis sensing of angular velocity and linear acceleration of the subject and outputting angular velocity and linear acceleration data;
- obtaining said angular velocity and linear acceleration data associated with said angular velocity and linear acceleration of the subject from said inertial measurement unit at a first time, the subject being stationary at said first time;
- calculating a drift error of a velocity of the subject as a function of time in response to said angular velocity and linear acceleration data at said first time;
- obtaining angular velocity and linear acceleration data associated with said angular velocity and linear acceleration of the subject from said inertial measurement unit at a second time, the subject being non-stationary at said second time;
- calculating a corrected velocity of the subject at said second time in response to said drift error and said angular velocity and linear acceleration data at said second time; and
- outputting said corrected velocity,
- wherein said calculating a corrected velocity of the subject at said second time in response to said drift error comprises calculating a corrected velocity according to the following equation:

$$\vec{v}_c = \vec{v} - \vec{f}(t)$$

where $\vec{v}$ is an uncorrected subject velocity calculated from said measured angular velocity and linear acceleration, $\vec{v}_c$ is said corrected velocity of the subject, and $\vec{f}(t)$ is a vector function in time of said drift error.

13. The method according to claim 12 wherein said determining said drift error of said velocity of the subject comprises determining a vector function in time of said velocity of the subject.

14. The method according to claim 12 wherein said angular velocity is substantially due to noise and said linear acceleration at said first time is substantially due to gravity and noise.

15. The method according to claim 12 where said first time is prior to the start of motion of the subject.

16. The method according to claim 12 wherein said first time is after completion of motion of the subject.

17. A method for non-invasively obtaining velocity information of a subject, said method comprising:
- attaching no more than one inertial measurement unit to the subject, said inertial measurement unit providing three-axis sensing of angular velocity and linear acceleration of the subject and outputting angular velocity and linear acceleration data;
- obtaining said angular velocity and linear acceleration data associated with said angular velocity and linear acceleration of the subject from said inertial measurement unit at a first time, the subject being stationary at said first time;
- calculating a drift error of a velocity of the subject as a function of time in response to said angular velocity and linear acceleration data at said first time;
- obtaining angular velocity and linear acceleration data associated with said angular velocity and linear acceleration of the subject from said inertial measurement unit at a second time, the subject being non-stationary at said second time;
- calculating a corrected velocity of the subject at said second time in response to said drift error and said angular velocity and linear acceleration data at said second time; and
- outputting said corrected velocity;
- obtaining said angular velocity and linear acceleration data associated with said angular velocity and linear acceleration of the subject from said inertial measurement unit at a third time, the subject being stationary at said third time,
- wherein said calculating said drift error of said velocity of the subject as a function of time is in response to said angular velocity and linear acceleration data at said first time and said third time.

18. The method according to claim 17 wherein said drift error determined in response to said first time and said drift error determined in response to said third time are consecutive and approximately equal to each other.

* * * * *